Oct. 23, 1951     C. P. SLAGLE     2,572,773
ARTICLE ORIENTING MECHANISM
Filed Oct. 29, 1949     5 Sheets-Sheet 1
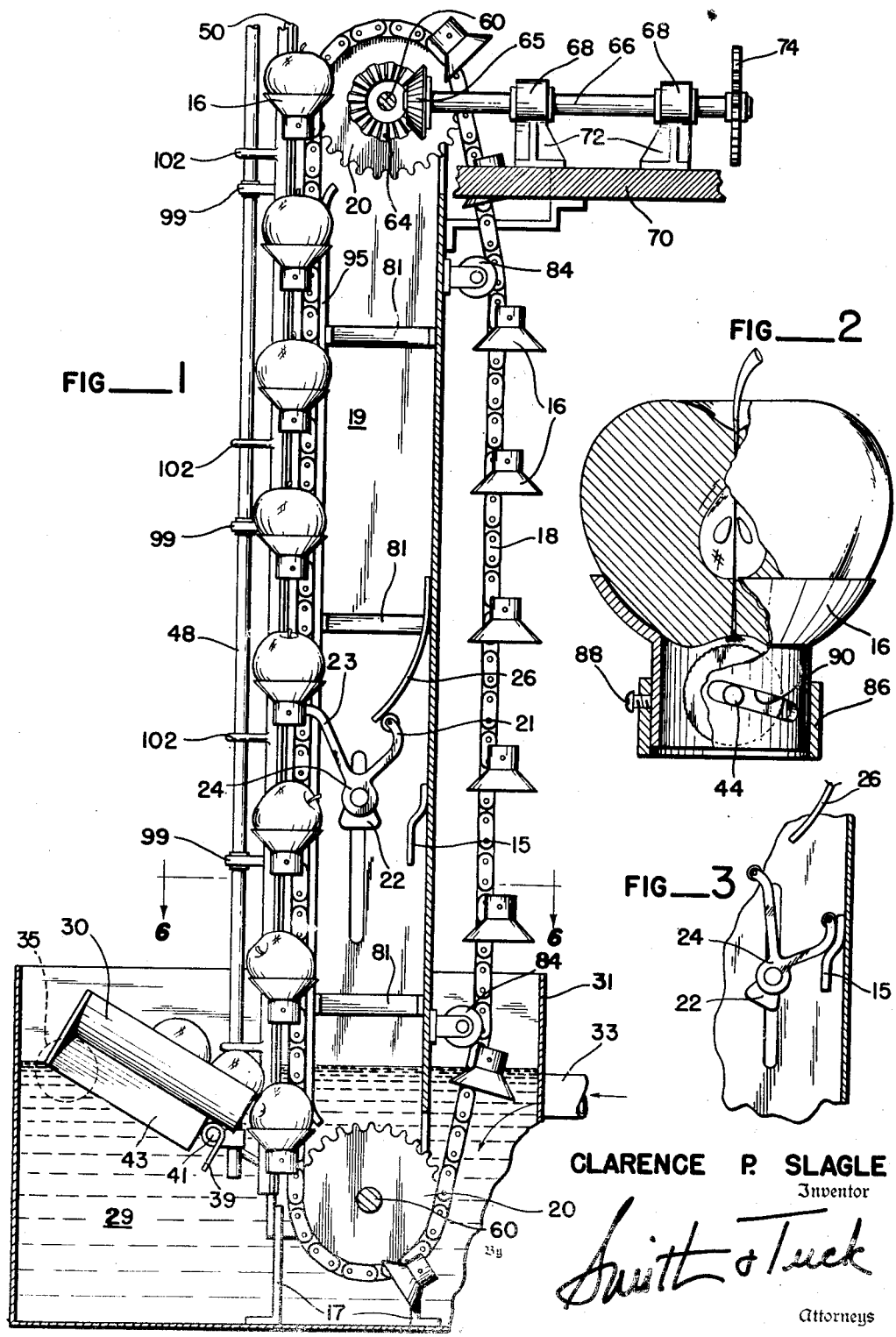
CLARENCE P. SLAGLE
Inventor
Smith & Tuck
Attorneys Oct. 23, 1951  C. P. SLAGLE  2,572,773
ARTICLE ORIENTING MECHANISM
Filed Oct. 29, 1949  5 Sheets-Sheet 2
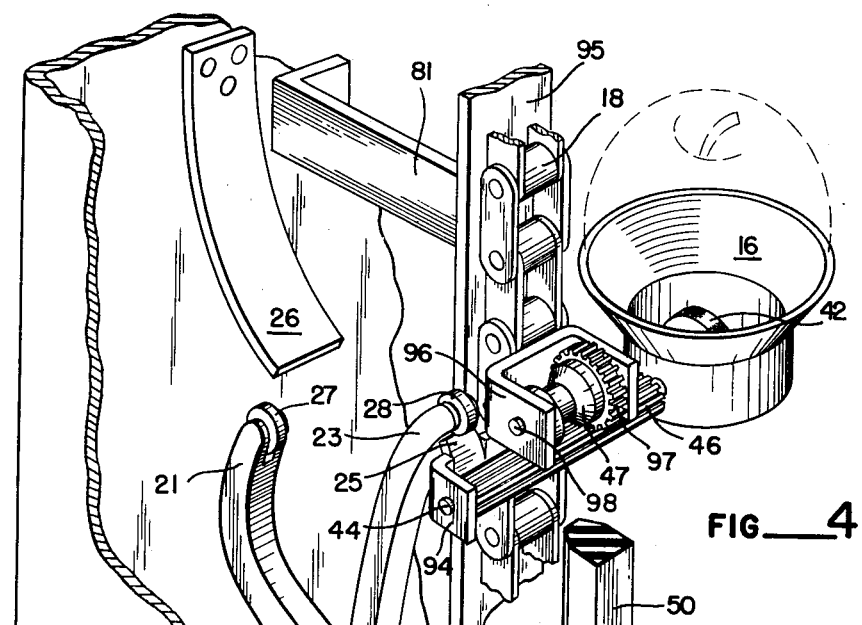
FIG_4
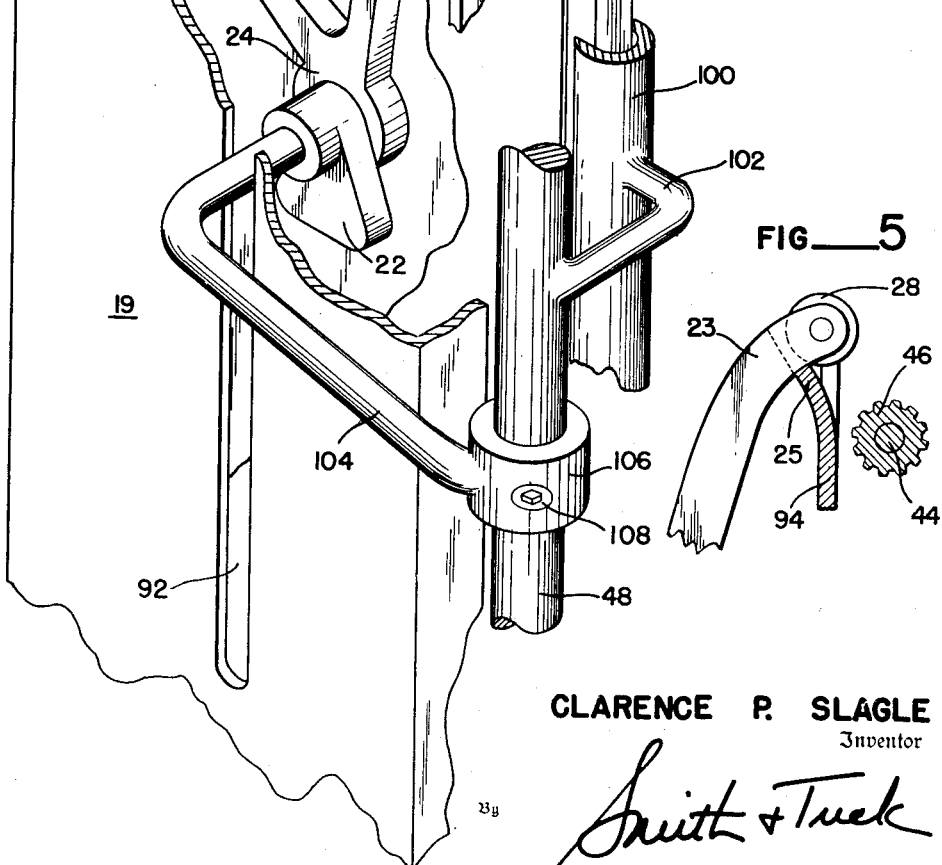
FIG_5
CLARENCE P. SLAGLE
Inventor
Smith & Tuck
Attorneys

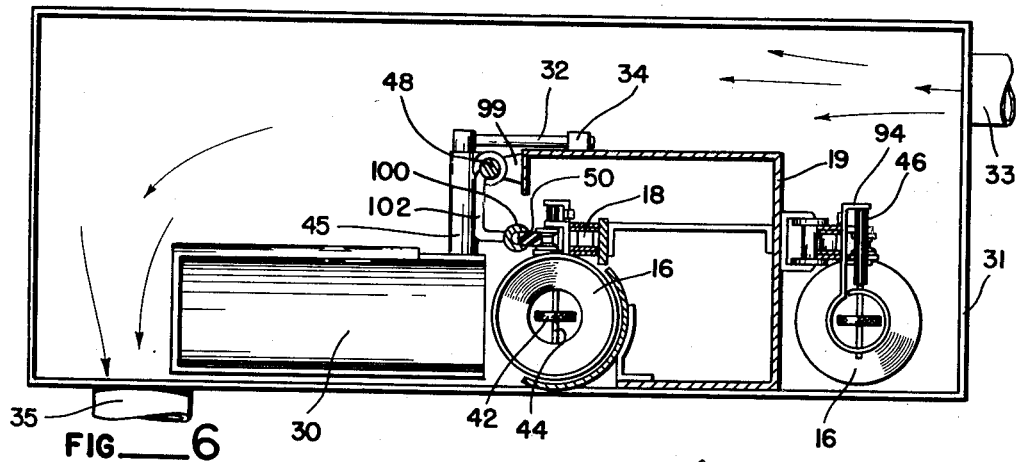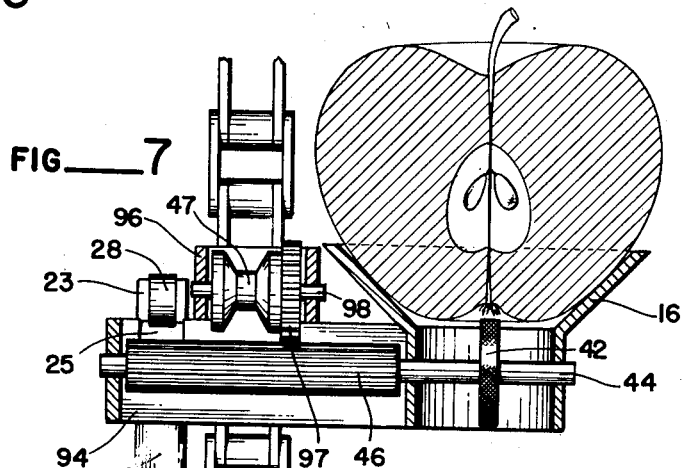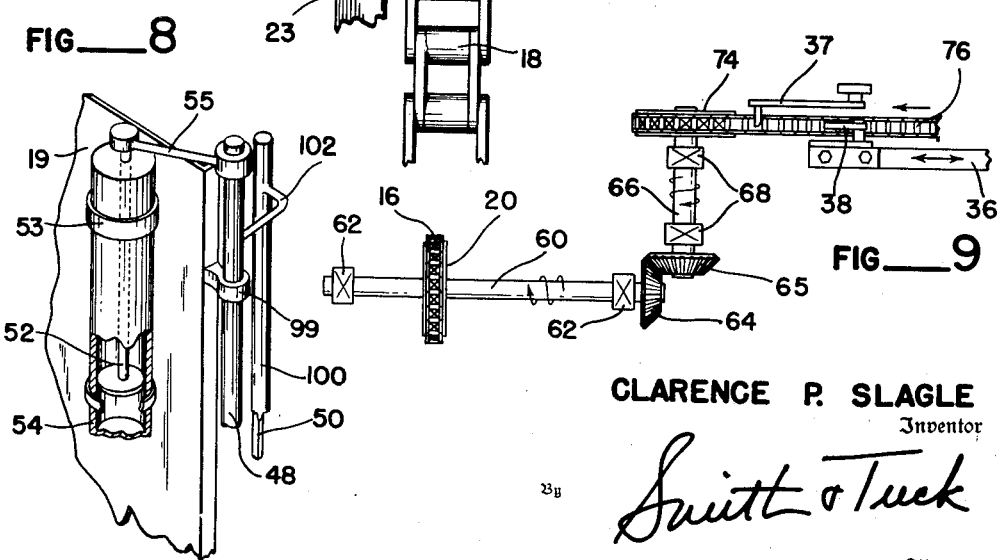

Oct. 23, 1951     C. P. SLAGLE     2,572,773
ARTICLE ORIENTING MECHANISM
Filed Oct. 29, 1949     5 Sheets-Sheet 4
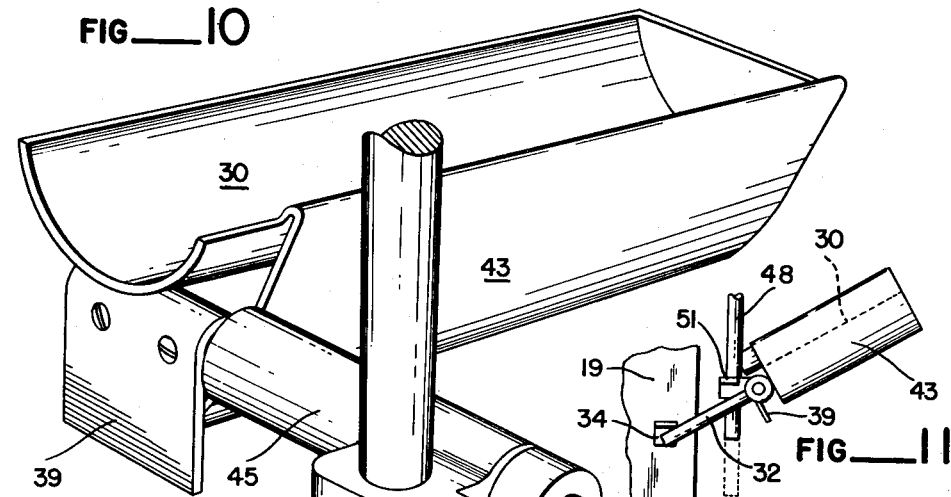
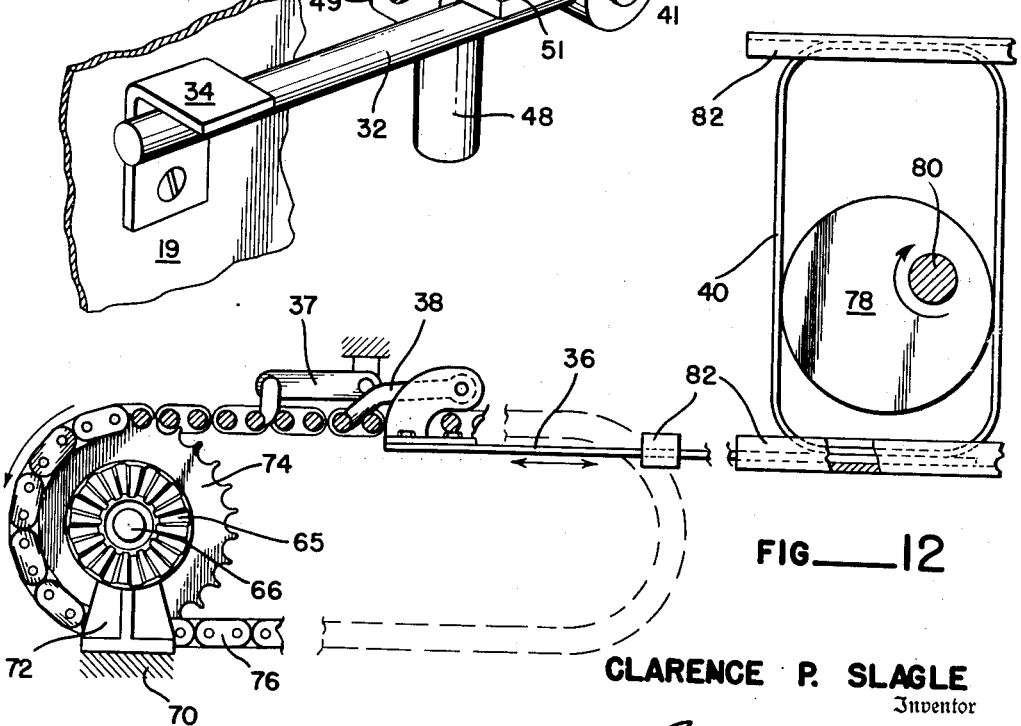
CLARENCE P. SLAGLE
Inventor
By Smith & Tuck
Attorneys

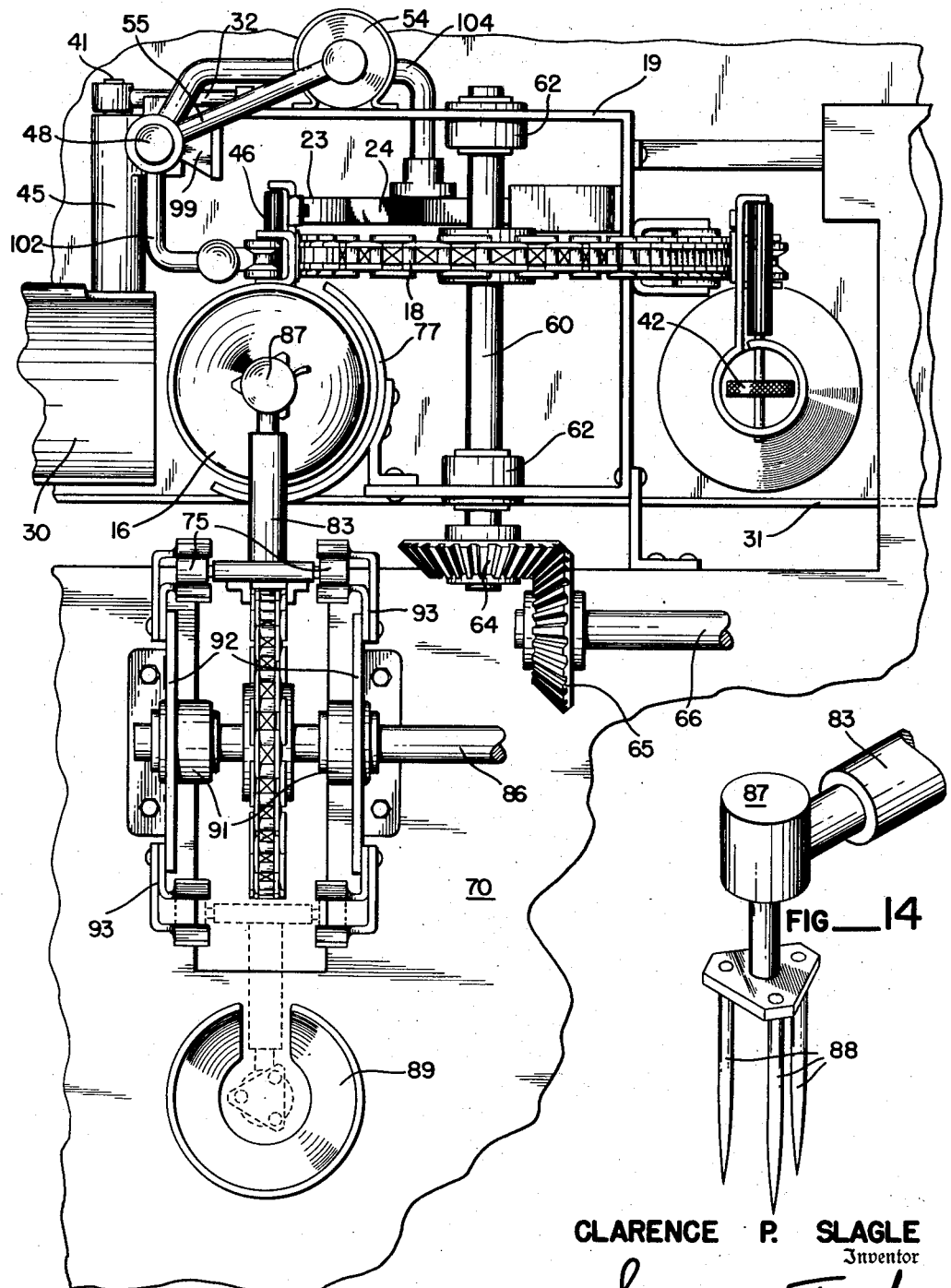

Patented Oct. 23, 1951

2,572,773

UNITED STATES PATENT OFFICE 2,572,773

ARTICLE ORIENTING MECHANISM

Clarence P. Slagle, Selah, Wash.

Application October 29, 1949, Serial No. 124,370

8 Claims. (Cl. 198—33)

My invention relates to an article orienting mechanism and, more particularly, to a mechanism for elevating and orienting a generally spherical article, having at least one indentation in its surface, such as fruit having a core indent.

Improvements in methods of mass production in industry are responsible for the constantly rising standard of living that we all enjoy. The need for increased mechanization is especially felt in the field of processing perishable fruits. This industry has a highly seasonal period of production, at which period a great volume of production must be accomplished in a relatively short time due to the perishable nature of the base material. The work is done largely by migratory workers and a decrease in the number of such employees is desirable due to the uneconomic nature of itinerant labor. Also, it is difficult to secure enough temporary workers because of the relatively high permanent employment at this time.

Savings in the processing of fruit are passed on to the nation's food consumers in the form of lower prices, hence they may enjoy more of this healthful food. Even in relatively non-perishable fruit processing, it is desirable to have increased mechanization because there is a resultant saving over manual processes.

The main problems in the mechanized processing of fruit are due to the irregular shape of the base material. It is necessary to orient the fruit in relation to the axis of the stem and core before such operations as peeling and coring can be performed.

An object of this invention is, therefore, to provide an improved method of orienting an article having a generally spherical shape with at least one identation in its surface, and of elevating the article from a flume or reservoir to a position where it may be picked up and transferred to a peeling and coring mechanism. Once the article has been oriented, of course the orientation should be maintained. It is imperative to accomplish these objectives in an inexpensive manner with a simply constructed and maintained machine having a high rate of efficiency.

In brief, these objectives are carried out in my invention by the following means: the fruit is placed in a flume or reservoir containing water. Positioned in the flume is an upright column having two sprocket wheels mounted thereon, one near the top and one under the surface of the water. The sprocket wheels are connected by an endless flexible chain. Means is provided for driving the sprocket wheels intermittently. Article carriers are mounted on the endless chain, equally spaced one from another.

The article carriers are cup-shaped, and associated with each carrier is a driven wheel projecting above the inner bottom surface of the carrier. Means is provided for rotating the driven wheel. A fruit in the article carrier is rotated by the driven wheel until it reaches a position with the core indent contiguous the wheel. At this point the driven wheel no longer contacts the surface of the fruit, and the fruit is stably supported by the inner surface of the cup.

The driven wheel is mounted on a shaft having a driving sheave external of the carrier. A reciprocally movably upright rail is positioned contiguous the path of said driving sheaves on that side of the orienting mechanism up which the article carriers move. The article carriers are moved intermittently a distance equal to the distance between carriers. Latching means is provided to attach the upright rail to an article carrier during the movement of said carrier upwards. At the end of this travel, means is provided to disengage the upright rail, and the rail falls rotating the driving sheaves, and the driven wheel rotates moving the article in the article carrier towards an oriented position. Means is provided for latching the rail to the next succeeding article carrier when the rail has travelled downwards a distance equal to the space between carriers. It can be seen that means is provided for moving the article carriers intermittently and for rotating the driven wheels when the article carriers are at rest.

A tiltable feeder trough, operatively attached to the bottom of the upright rail, is positioned in the flume or reservoir partially submerged in the water. The trough has an open end contiguous the upward path of the article carriers. By action of the upright rail the trough is submerged below the water level, comes up carrying several pieces of fruit, and tilts, whereupon one fruit rolls off the open end and into an article carrier. This carrier moves upward and the next carrier is in a position to receive another fruit, whereupon the process is repeated.

Near the top of the travel of the fruit, means is provided for picking up the then oriented fruit and transferring the fruit to the peeling and coring mechanism. A preferred form of transfer mechanism is described in my co-pending application, Serial No. 115,157.

The method and means by which the aforesaid objects and other objects are accomplished by my invention will be best understood from the following description when read with reference to the accompanying drawings, in which:

Figure 1 is an elevational view partly in section, illustrating a machine embodying the present preferred form of my invention;

Figure 2 is an enlarged elevational view, partly in section, of one form of article carrier in my orienting mechanism;

Figure 3 is a fragmentary elevational view, partly in section, of the latch portion of the mechanism in a different position than shown in Figure 1;

Figure 4 is an enlarged perspective view of the latch and article carrier assemblies, part of the supporting column of the orienting mechanism being broken away;

Figure 5 is an enlarged vertical sectional view of the means of engagement between the latch and the article carrier assembly, also shown in Figure 4;

Figure 6 is a horizontal sectional view taken along line 6—6 of Figure 1;

Figure 7 is an enlarged vertical sectional view of the article carrier assembly in which the article carrier is constructed in a different manner than in Figure 2;

Figure 8 is a fragmentary perspective view of the dash-pot assembly;

Figure 9 is a schematic view of the means for intermittently driving my orienting mechanism;

Figure 10 is an enlarged fragmentary perspective view of the tiltable feeding trough shown in another position in Figure 1;

Figure 11 is an elevational view of the feeding trough assembly depicted in the same position as Figure 1 and from the opposite side;

Figure 12 is an enlarged elevational view of the means for intermittently driving my orienting mechanism, also shown in Figure 9;

Figure 13 is a fragmentary plan view of my orienting mechanism shown in conjunction with a preferred form of transfer mechanism for picking up oriented fruit from the orienting mechanism and transferring the fruit to another location still in an oriented position, the transfer mechanism being shown in the act of picking up an oriented apple; and Figure 14 is an enlarged perspective view of a fork used in the transfer mechanism to pick up oriented fruit, shown in Figure 13 in engagement with an apple in an article carrier.

The flume

My elevating and orienting mechanism is preferably used in conjunction with a flume, or reservoir 31, which I have shown in Figures 1 and 6 as formed with sheet metal walls in a rectangular shape. An inlet conduit 33 permits fluid 29, preferably water, to be introduced to the flume 31 under pressure; and, by providing the outlet conduit 35 remote from the inlet conduit 33, a current of fluid is created across the flume 31 so that fruit placed therein are urged in a uniform direction, in this case toward one end and near the corner. The feeder trough 30, which will be described in detail later, is positioned in this area and is in a position to pick up the fruit which are congregated in this area. As long as there are a substantial number of fruit in the flume 31, the feeder trough 30 will regularly pick up fruit during the feeding operation.

Supporting column and sprockets

An upright column 19 is mounted on supporting legs 17 which are attached to the bottom of the flume 31. The upright column 11 is generally U-shaped in cross section.

Two sprocket wheels 20 are mounted on sprocket wheel shafts 60, which are supported by bearings 62 set in the upright column 19. One sprocket wheel is near the top of the upright column 19 and one is near the base of the upright column below the fluid level. This is best depicted in Figures 1 and 13.

Driving means

A bevel gear 64 is set on one end of the upper sprocket wheel shaft 60 toward the transfer mechanism as shown in Figure 13. Another bevel gear 65 is positioned in engagement with the aforesaid bevel gear 64 and is mounted on one end of a shaft 66, as shown in Figures 9 and 13. This shaft is set in bearings 68 mounted on legs 72 attached to the peeling mechanism platform 70 as shown in Figure 1.

At the other end of the shaft 66 is a driven sprocket wheel 74. An endless drive chain 76 is mounted on the driven sprocket wheel 74 and another sprocket wheel not shown in the drawings. Intermittent motion is imparted to the drive chain 76 by means of an eccentric driving assembly. A drive shaft 80 is connected with the source of power of the peeling and coring mechanism and rotates at a uniform rate. A cam member 78 is mounted eccentrically on the drive shaft. The cam member 78 is set in a frame 40, which is slidably mounted in guide members 82 in a horizontal position. This is shown in Figure 12. As the drive shaft 80 rotates, a reciprocal movement is imparted to the frame 40. One end of a rod 36 is attached to the frame 40 with its free end extending contiguous the path of the endless drive chain 76. A pusher dog 38 is set on the free end of the rod 36, in position to move the drive chain 76 in one direction only. As rod 36 is moved reciprocally, intermittent movement in one direction is imparted to the drive chain. A stop dog 37 acts on the drive chain, permitting movement of the drive chain 76 only in one direction.

It should be noted that other means may be provided for imparting intermittent motion to the sprocket wheels 20 on the upright column 19, this being merely the preferred form.

Flexible chain

There are two idler rollers 84 positioned on the outside of the upright column 19, one below the upper sprocket wheel and one above the lower sprocket wheel. A flexible endless chain 18 is mounted on the sprocket wheels 20 and over the rollers 84. The rollers 84 serve to tighten the flexible chain 18 and to reduce transverse movement of the chain 18 on the other side of the upright column. The chain 18 moves downward on the roller side of the upright column 19. The U-shaped upright column is open on the side at which the chain moves upwards. There is a backing plate 95 positioned alongside the upward path of the chain 18 to keep the chain from moving transversely inwards, thereby reducing any tendency of the chain to "slap." The backing plate 95 is attached to the opposite side of the upright column 19 by webs 81, as best shown in Figure 1. The backing plate 95 has slightly in-turned ends to avoid catching the endless chain 18.

Article carriers

Cup-shaped article carriers 16 are mounted on the outside of the flexible chain 18 and are spaced equidistantly by means to be recited later. As shown in Figure 1, on the side of the upright column 19 with the backing plate 95, the cups are directed upward and on the other side, with the rollers 84, they will be downward.

The inner surface of the sides of the cup-shaped portion of the article carriers 16 support fruit placed therein as shown in Figures 2 and 7. A driven wheel 42, set on a shaft 44, positioned in the base of the article carriers 16, extends into the cup-shaped portion to a level where it will contact the surface of fruit placed therein, except when the core indent of the fruit is directly above the driven wheel 42. If fruit having a core indent is placed in the article carrier 16 and the driven wheel 42 is rotated, the fruit will be rotated by the action of the driven wheel 42 on the surface of the fruit until the fruit reaches a position with the core indent above the driven wheel, at which point the driven wheel will no longer contact the surface of the fruit and the fruit will be maintained at its now oriented position with the core axis vertical.

In the structure depicted in Figure 7 the shaft 44 has a fixed position in relation to the article carrier 16. A modification is shown in Figure 2 with a sleeve 86 enclosing the base of the article carrier. The sleeve 86 is maintained in a desired position by means of set screw 88. The shaft 44 has a fixed relationship with the sleeve 86. The article carrier 16 has helical slots 90 in its base wall to receive the shaft 44. Rotation of the article carrier 16 with relation to the sleeve 86 will vary the distance that the driven wheel 42 projects into the cup portion of the article carrier.

Referring to Figure 7, the article carrier 16 is attached to the flexible endless chain 18 by means of a strap 94. the middle of strap attaching to the flexible chain 18, one end fixed to the base of the article carrier 16, and the other end being bent to receive the end of the shaft 44 of the driven wheel 42. In the method of construction of the article carrier shown in Figure 2, strap 94 is attached to the sleeve 86, instead of the base of the article carrier.

A horizontally corrugated roller 46 is fixed on the shaft 44 between the article carrier 16 and the bent end of the strap 94. U-shaped strap 96 is attached to the endless chain 18 immediately above the strap 94, and the legs of the U-shaped strap extend above the corrugated cylinder 46, and a second shaft 98 is mounted therein, with its axis parallel to the axis of the corrugated cylinder 46. A spur gear 97 is set on this shaft 98 in engagement with the corrugated cylinder 46. The grooved sheave 47 is fixed on the shaft 98 at one side of the spur gear 97.

A bar 50 is positioned in contact with the U-grooved sheave 47 by means to be recited later. Means is provided to move the bar 50 relative to the U-grooved sheave 47. When the U-grooved sheave 47 is rotated, the spur gear 97 follows rotating the corrugated cylinder 46, and the driven wheel 42 in turn is rotated, moving a fruit in the article carrier 16 toward orientation, as heretofore described.

Rail assembly

Outside of the upright column 19, at one side of the endless chain 18, is positioned a vertical rod 48. This is on the side of the orienting mechanism at which the article carriers 16 move upwards, as can be seen in Figures 1 and 4. The rod is slidably mounted in guide posts 99 attached to the upright column 19. A vertical rail 50 is positioned to bear against the U-grooved sheaves 47. The rail is preferably made of hard rubber to insure operable engagement with the sheave 47. The back of the rail 50 is held by a semi-circular upright member 100 which in turn is attached to the vertical rod 48 by horizontal connecting members 102.

Latch assembly

There is a vertical slot 92 in the upright column 19 of a length slightly longer than the distance between article carriers 16, and an L-shaped rod 104 travels in said slot with its longer arm attached to the upright rod 48 by means of a bushing end 106 encircling the upright rod, said rod being held fixed by means of a set pin 108 in the bushing end 106. The shorter arm of the L-shaped rod 104 extends through the vertical slot 92 and pivotally carries latch 24. The latch member 24 has a hook arm 23 extending towards the article carriers 16; a cam follower arm 21 extending in the opposite direction; and a counter-weight 22 attached to its under side which tends to keep the hook arm 23 and the cam follower in the general upright position.

A roller 28 is provided on the end of the hook arm 23 and is engageable with lip 25 on strap 94 to latch the rail assembly to the article carrier assembly. When the roller 28 is in engagement with lip 25, it can be seen that the rail assembly will move upward with the article carrier assembly, as shown in Figures 1 and 4.

On the inside of the upright column 11, next to the cam follower arm 21, are two superposed cams. The upper cam 26 is positioned at a level above the vertical slot 92. As the rail assembly moves upward, a roller 27 on the cam follower arm 21 is pulled rearward and the hook arm 23 is disengaged from the lip 25. The rail assembly, being then unlatched from the article carrier, descends, and rail 50 causes rotation of the U-shaped sheave 47 causing the driven wheel 42 to rotate, thereby moving the fruit in the article carriers 16 along the path of the rail 50 toward orientation. In Figure 1 the upper cam 26 is in contact with the cam follower arm 21 and any further movement upwards of the latch 24 will serve to disengage the rail assembly from the article carrier assembly.

As the rail assembly moves downward, the cam follower arm 21 strikes the lower cam 15 and the hook arm 23 is swung back to engage with the next following lip 25 associated with the next lower article carrier 16. In Figure 3 the cam follower arm 21 is shown as it first contacts the lower cam 15. The rail assembly is thus again latched to the article carrier assembly and the operation is repeated.

The means for causing intermittent motion of the endless chain 18, heretofore described, is so timed and spaced that each advancing motion moves the article carriers 16 a distance equal to the distance between carriers. At the beginning of the movement the rail assembly is latched to the adjacent article carrier 16. As advancing movement ends, the rail assembly is unlatched from the article carrier and descends. The rail assembly completes its downward motion and is re-latched on the next succeeding article carrier before the endless chain 18 moves again. It can thus be seen that the driven wheel 42 only moves when the article carriers 16 are at rest and, therefore, the fruit is only moved towards orientation when the article carriers are motionless. Conversely, the article carriers 16 only move when the driven wheels 42 are at rest.

This separate action serves several purposes. The fruit in the article carriers 16 has less tendency to jump out when the action is thus separated. The quick action of rail 50 sharply accelerates the driven wheel 42 and it is found that the fruit is oriented quicker by intermittent accelerated motion than by a regular motion. Also, the operation of the rod 48 facilitates the action of the feeder trough, as will be described later.

Referring to Figure 8, a dashpot is attached to the upward end of the vertical rod 48 to cushion the motion of the rail assembly. The cylindrical body 54 of the dashpot is attached to the upright column 19 by means of a collar 53. The upper end of the piston 52 is attached to the vertical rod 48 by means of a horizontal rod 55.

Feeder trough

As mentioned before, a feeder trough 30 is positioned in the flume 31 and means is provided to urge the apples toward that position. A shaft 41 is rotatably mounted in a connecting member 45 encircling the lower end of the vertical rod 48. The vertical rod 48 is held fixedly by means of a set screw 49 in the connecting member 45. On one end of the shaft 41 is fixedly attached a vertical plate 39. The open end of the feeder trough 30 is mounted on the vertical plate 39, with the free closed end of the trough extending outward from the orienting mechanism. There is a deflecting flange 43 extending downward from the edge of the feeder trough 30 towards the inlet conduit 33. The vertical plate 39 and the flange 43 serve to keep fruit from floating under the feeder trough 30 and interfering with its movement. A rod 32 attached to the end of the shaft 41 on the other side of the vertical rod 48 from the feeder trough 30, extends in an opposite direction from the feeder trough. Plate 34 attached to the upright column 19 extends over the free end of the rod 32 and forms a stop for rod 32.

It can be seen that, as the vertical rod 48 moves up and down, the rod 32 will pivot, the free end being held by the angle plate 34; shaft 41 will rotate; and the feeder trough will be raised and also tilt. A flange 51 on the connecting member 45 limits the pivot of the rod 32 so that, when the rod 32 and the feeder trough 30 are in a horizontal position, any further movement of the vertical rod 48 downward will submerge the trough.

The feeder trough 30 is positioned so that it is submerged beneath the surface of the water 29, when the vertical rod 48 is in its lowermost position, a depth great enough that fruit may float to above the feeder trough. As stated before means is provided to urge the fruit towards that position. As vertical rod 48 moves upward, the feeder trough 30 rises and tilts, and fruit in the trough will roll towards the open end. The open discharge end is contiguous the path of the article carriers 16, and, as the feeder trough picks up a load each time that the vertical rod 48 completes its movement cycle, each article carrier is loaded as it passes the trough. As before set forth, the rail assembly makes a cycle each time the endless chain 18 moves the distance between article carriers. The trough is large enough to hold several fruit so that at least one fruit will be in position to descend to the article carrier 16 on each cycle. The operation of these parts will be best understood from Figures 1, 10, and 11.

Transfer mechanism

The transfer mechanism is described more completely in my co-pending application, Serial No. 115,157, filed September 12, 1949. The preferred form of that transfer mechanism is shown in part in Figure 13. There is an arm 83 mounted on a flexible chain 85 in an outward direction, said chain 85 running over a sprocket wheel set on a shaft 86. The shaft 86 is set in bearings 91 mounted on two parallel cheek plates 92.

There is a spear head 87 mounted on the end of the arm 83 having several spears 88. The spears are directed so that, when the arm 83 swings toward the orienting mechanism, the spears 88 are in position to spear a fruit oriented in the uppermost article carrier 16. A guard plate 77 attached to the upright column 19 serves to steady the article carrier 16. There are rollers 75 attached to the base of the arm 83 which runs in guideways 75 when the spears 88 are descending into an oriented fruit, to insure that the spears 88 travel in the designed path. The guideways are attached to the cheek plates 92.

The arm 83 travels reciprocally, moving from the position in engagement with the fruit shown in Figure 13 to an opposite position shown in dotted lines. As the arm travels to this second location, the spears 88 are inverted and, at the end of the travel, the fruit is intercepted by a cup-like receiver 89 having a slot for the arm 83 to pass through, but retaining the fruit. The fruit is still in an oriented position with the core axis vertical. There is means to transfer the fruit from the cup-like receiver 89 to a mechanism for peeling and coring, as more fully explained in the co-pending application. Guide ways 93 at this end of transfer mechanism receive the rollers 75 and steady the arm 83.

The transfer mechanism is timed with the orienting mechanism so that the fruit is picked out of the article carrier 16 while the carrier is at rest and the transfer mechanism has completed its cycle, by transferring the fruit to the cup-like receiver 89 and returning, in time to spear the fruit from the next article carrier 16 as it reaches the uppermost position.

In my invention I have provided a mechanism for picking fruit from a flume, for elevating the fruit while orienting the fruit to a position with the core axis vertical, and for picking the then oriented fruit from the top of the orienting mechanism, and transferring the fruit to a position to be picked up by a peeling and coring mechanism while maintaining the orientation. The process is fully automatic and has a high rate of efficiency. The apparatus is relatively simple and easy to maintain, and requires little attention during operation.

This mechanism for improving the mechanized processing of fruit will reduce production costs and thereby benefit the nation's food consumers.

Although I have illustrated and described only a single form of the invention, I am aware that modifications can be made therein by any person skilled in the art, without departing from the spirit and scope of the invention as expressed in the claims.

I claim:

1. A mechanism for orienting a generally spherical article having at least one indentation in its surface, comprising: a cup-like carrier for supporting such an article, said carrier having an opening in the base thereof; a rotatable shaft associated with said carrier below its article-supporting surface; a driven wheel on said shaft extending through said slot such a distance that the driven wheel will make contact with such an article except when the indentation of the article is contiguous with said wheel; a drive wheel on said shaft external of said carrier; a reciprocally movable upright rail in contact with said drive wheel; means for intermittently moving said cup-like carriers upward; a latching means for attaching said rail to said means for moving said carrier; means for disengaging said latching means from said means for moving said carrier; and means for re-engaging said latching means to said means for moving said carrier; said means for intermittently moving said carrier being so timed, and said means for disengaging and re-engaging said latching means being so placed that, when said carrier is stopped, said rail is free to descend, thereby rotating said drive wheel and said rail is relatched before said carrier moving means again advances upward.

2. The subject matter of claim 1 in which there is a dash-pot attached to said rail operable to cushion the descent of said rail.

3. A mechanism for orienting generally spherical articles having at least one indentation in their surface, comprising: cup-like carriers for supporting said articles, each said carrier having an opening in the base thereof; a rotatable shaft associated with each of said carriers below its article-supporting surface; a driven wheel on said shaft extending through said slot such a distance that the driven wheel will make contact with such an article except when the indentation of the article overlies said driven wheel; a drive wheel on said shaft external of said carrier; two sprocket wheels spaced apart vertically; an endless flexible chain on said sprocket wheels, said cup-like carriers being attached to said flexible chain and spaced at even intervals therealong; means for intermittently moving said sprocket wheels; a reciprocally movable upright rail in contact with said drive wheels on the upwardly movable flight of said chain; a latching means for engaging said rail to said chain for movement therewith; means for disengaging said latching means to permit said rail to descend to rotate said drive wheels; and means for re-engaging said rail to said chain; said means for moving said sprockets being so timed and said means for disengaging and re-engaging said latching means being so placed that, when the carrier chain has moved forward one interval, said rail is unlatched and descends, thereby rotating said drive wheels, to be relatched when said carrier chain moves upward again.

4. The combination with the subject matter of claim 3, comprising: a reservoir encasing the lower part of said orienting mechanism to contain said spherical articles; a pivoted article feeder trough having one open end, said open end being adjacent the upward portion of the path of the cup-like carriers, and means for swinging said trough to urge a spherical article, floating on the surface of said reservoir, into one of said cup-like carriers while the same is immersed.

5. A mechanism for orienting generally floatable spherical articles of fruit of the type having at least one surface indentation, comprising: a flume to receive bulk quantities of said articles and fluid to float the same; means for imparting a current to the fluid in said flume to urge the articles in an unidirectional path, means in said flume for grouping said articles and for holding them against the urgence of said current; a series of movable cups arranged in an upright endless path of travel, having its lower portion immersed in said flume and arranged so that the flight of said cups that is open upward rises adjacent the location of said grouped articles; means for intermittently advancing said series of cups along the path of travel; means for urging a floatable article over an upwardly open immersed cup during non-moving intervals of said series; and a rotatable member in the bottom of each said cup in contact with an article therein to revolve the same until the indentation overlies said member.

6. The structure according to claim 5 in which the means for urging a floatable article over an upwardly open immersed cup during non-moving intervals of said series, comprises: a lever immersed in said flume and intermediately pivoted, means for raising the pivot of said lever during raising movement of said cups; a trough in said flume and directed at the upward path of said cups and carried by one arm of said lever, said trough to receive articles floating in said flume; and a fixed abutment above said other arm of the lever to cause the lever to rock about its pivot when the latter is raised, whereby said trough is tilted toward said cups and articles therein are directed into said cups.

7. A mechanism for elevating one-after-the-other and for orienting generally floatable spherical articles of fruit of the type having at least one surface indentation, comprising: a flume to receive bulk quantities of said articles and fluid to float the same; an upright column in said flume having a general U-shaped cross section; a pair of sprockets vertically spaced apart and rotatably mounted between the legs of said column; an endless chain encircling said sprockets; means for intermittently advancing said chain about said sprockets, whereby it descends into the flume and rises therefrom in opposite flights; a series of cups mounted on said chain to move therewith in an upright closed path; each said cup having a bottom opening and an axle mounted beneath said opening and extending across the same; a driven wheel on said axle in said opening and extending above the bottom of the cup to contact the surface of fruit therein; a drive on said axle to one side of said cup; a rail mounted on said column for vertical sliding reciprocal movement, said rail having frictional contact with the drive wheels of those cups on the ascending flight of said chain; means for intermittently advancing said chain a predetermined degree of travel in its path; a tiltable latch hook carried by said rail and engageable with a portion of each said cup to raise said rail with each advance of said chain and the cups thereon; a cam follower associated with said tiltable latch hook to move therewith; a cam in the path of said cam follower adjacent the upper end of its path of movement and operable to disengage said hook from a cup to permit the rail to descent independently of the cup and thereby produce rotation of the drive wheel; a second cam in the path of said cam follower adjacent the lower end of its path to re-tilt said latch hook into a position to contact the next following cup; stop means to limit the downward travel of said rail and latch hook; an intermediately pivoted lever carried by said rail and immersed in said flume, one end of said lever being provided with trough means operable upon rising in the flume to urge fruit articles in said flume into the path of an immersed cup of the ascending flight, the other end of said lever being associated with an abutment member whereby the lever is swung, during rising movement of the rail, about its intermediate pivot to actuate said trough means.

8. A mechanism for elevating one-after-the-other and for orienting generally floatable spherical articles of fruit of the type having at least one surface indentation, comprising: a flume to receive bulk quantities of said articles and fluid to float the same; an upright column in said flume having a general U-shaped cross section; a pair of sprockets vertically spaced apart and rotatably mounted between the legs of said column; an endless chain encircling said sprockets; means for intermittently advancing said chain about said sprockets whereby it descends into the flume and rises therefrom in opposite flights; a series of cups mounted on said chain to move therewith in an upright closed path; each said cup having a bottom opening and an axle mounted beneath said opening and extending across the same; a driven wheel on said axle in said opening and extending above the bottom of the cup to contact the surface of fruit therein; a drive on said axle to one side of said cup; a rail mounted on said column for vertical sliding reciprocal movement, said rail having frictional contact with the drive wheels of those cups on the ascending flight of said chain; means for intermittently advancing said chain a predetermined degree of travel in its path; a tiltable latch means carried by said rail to engage a portion of each cup to raise the rail with each advance of said chain and the cups thereon; means in the upper path of said latch means to tilt and disengage the same from a cup to permit descent of the rail and rotation of certain of said drive wheels; means in the lower path of said latch means to re-tilt and dispose said latch means in the path of an ascending cup; stop means to limit the downward travel of said rail and latch means; an intermediately pivoted lever carried by said rail and immersed in said flume, one end of said lever being provided with trough means operable upon rising in the flume to urge fruit articles in said flume into the path of an immersed cup of the ascending flight, the other end of said lever being associated with an abutment member whereby the lever is swung, during rising movement of the rail, about its intermediate pivot to actuate said trough means.

CLARENCE P. SLAGLE.

REFERENCES CITED

The following references are of record in the file of this patent:

UNITED STATES PATENTS

| Number | Name | Date |
|---|---|---|
| 1,285,560 | Chase | Nov. 19, 1918 |
| 1,429,092 | Paranteau | Sept. 12, 1922 |
| 1,430,628 | Coons | Oct. 3, 1922 |
| 1,445,997 | Coons | Feb. 20, 1923 |
| 2,042,677 | Miller | June 2, 1936 |
| 2,502,779 | Coons | Apr. 4, 1950 |